(12) United States Patent
Courchaine et al.

(10) Patent No.: US 11,200,213 B1
(45) Date of Patent: Dec. 14, 2021

(54) DYNAMIC AGGREGATION OF DATA FROM SEPARATE SOURCES

(71) Applicant: Amazon Technologies, Inc., Seattle, WA (US)

(72) Inventors: Oscar Allen Grim Courchaine, Seattle, WA (US); Ankur Choudhary, Seattle, WA (US); Frank Harris, Wenatchee, WA (US); Alok Nath Katiyar, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 460 days.

(21) Appl. No.: 15/989,583

(22) Filed: May 25, 2018

(51) Int. Cl.
| | | |
|---|---|---|
| *G06F 16/00* | (2019.01) | |
| *G06F 16/21* | (2019.01) | |
| *G06F 7/14* | (2006.01) | |
| *G06F 16/27* | (2019.01) | |
| *G06F 16/951* | (2019.01) | |
| *G06F 16/242* | (2019.01) | |

(52) U.S. Cl.
CPC .............. *G06F 16/214* (2019.01); *G06F 7/14* (2013.01); *G06F 16/2425* (2019.01); *G06F 16/27* (2019.01); *G06F 16/275* (2019.01); *G06F 16/951* (2019.01)

(58) Field of Classification Search
CPC ...... G06F 16/214; G06F 16/951; G06F 16/27; G06F 16/275; G06F 16/2425; G06F 7/14
See application file for complete search history.

(56) References Cited

U.S. PATENT DOCUMENTS

2012/0271845 A1* 10/2012 Netz ................. G06F 16/24537
707/769
2017/0351697 A1* 12/2017 Brosch .................. G06F 3/0683

* cited by examiner

*Primary Examiner* — Paul Kim
(74) *Attorney, Agent, or Firm* — Knobbe Martens Olson & Bear, LLP (57) ABSTRACT

Generally described, one or more aspects of the present application correspond to techniques for dynamically aggregating data records from separate sources. The data merging process can be implemented by an aggregation computing resource that uses a lockstep paging system to query multiple database platforms for the same range of records, merges the records returned by the database platforms, and continues identifying a next range of records for which the database platforms should be queried until all records have been merged into a single listing. These techniques can be used to unify records during a database migration process.

17 Claims, 5 Drawing Sheets

DYNAMIC AGGREGATION OF DATA FROM SEPARATE SOURCES

BACKGROUND

Database migration involves transferring data from one storage device, format, or system to another storage device, format, or system. Database migration from one database platform to another can occur for a variety of reasons, including storage equipment replacement and upgrading to new database technologies. Database migration can involve the migrated database retaining or changing the logical schema design and/or physical design of the source database. The logical schema design specifies how data is grouped into tables or other data structures, as well as the relationships between these data structures. The physical design specifies the physical configuration of the database on the storage media, which includes, for example, how to create and maintain indexes, how to partition data, how to distribute data over cluster nodes, how to apply replication, and so forth.

Although database migration from one database platform to another platform may improve performance and scalability of the database, maintaining data integrity is a key challenge of data migration, particularly in view of possible underlying changes to the database design. For this reason, the migration process can involve thorough testing and be implemented in a controlled manner, for example by using a migration tool to process data from the source database into the migrated database.

DETAILED DESCRIPTION

Generally described, the present disclosure relates to providing dynamic aggregation of database records from separate sources, for example from two different database platforms that are simultaneously in use during a database migration process, to enable a unified view of the data stored in the separate sources. Illustratively, separate sources may exist for a data set (e.g., a set of database records) due to migration of the data set from a source database to a target database. In the disclosed system, the database records can represent user activity within the system, and as such may be relied on by various other systems, such as an analytics application that assesses system usage. During a migration process, neither the source database nor the target database may contain the complete data set. Moreover, the source and target databases may at times contain overlapping records. This configuration of multiple databases may prevent other systems, such as an analytics application, from accessing a complete and accurate set of records at a single source. One potential solution to such a situation to halt operation of other systems while migration completes. However, this may be infeasible in practice, as migration of records may in some instances require more time than would be permissible to halt the other systems (particularly in instances where other systems require continuous operation). Thus, what is needed is a mechanism for systems to access database records spread across multiple data sources while providing a unified view of those records. Moreover, to minimize impact to operation of these systems, it is preferable that this mechanism not significantly increase the time required to execute a query against the records.

The aforementioned problems, among others, are addressed in some embodiments by the disclosed techniques for dynamically aggregating data records from separate sources. The disclosed techniques provide a data merging process that can ensure that a system, such as an analytics application, retains consistency in access to records spread across multiple data sources without significantly increasing execution time of queries against those records. The data merging process can be implemented by an aggregation computing device that uses a lockstep system to query all data sources for the same records, merges the records returned by the data sources, and continues identifying a next range of records for which the data sources should be retrieve until all records across the sources have been merged into a single listing. The aggregation computing device can preemptively optimize a range of records being retrieved by advancing a start of the range to a lowest value record that exists in either database after the previous range. The lowest value may, for example, represent a primary key value for each record, which may be a key in a relational database that is unique for each record, so can serve as a unique identifier. The primary key value for a record may in some instances also be referred to as a "record ID." As described below, merging of records from data sources can involve identifying and resolving any conflicting records retrieved from different data sources. In one embodiment, conflict resolution can include selecting a record from the database that is assigned priority (e.g., an "authoritative" database, which may for example be a destination database during a data migration).

As would be appreciated by one of skill in the art, the use of an aggregation computing resource, as disclosed herein, represents a significant technological advance over prior implementations. Specifically, the aggregation computing resource is able to mediate record requests between the analytics application and multiple databases without significantly increasing the time of execution of the record query. For example, the aggregation computing resource dynamically selects a range of records to query to avoid having queries returned with no results. This can involve pinging the databases for a lowest record ID beyond any most recently queried range, and setting the new range based at least partly on that lowest record ID. Further, the dynamic record aggregation techniques provide the analytics application with a complete, accurate list of records, even during a lengthy database migration process. Maintaining consistency with respect to a set of records can be a challenge when reading from different data sources with potentially conflicting data, however the disclosed aggregation techniques provide that consistency by filtering out any conflicting records. As such, the embodiments described herein represent significant improvements in computer-related technology.

In some implementations, the disclosed techniques can operate on paginated data. Pagination is a technique for breaking large record sets into smaller portions called pages. Further, the examples presented herein focus on data in the form of a record reflecting a memorialization of some activity. However, the disclosed techniques can operate on any type of data where individual portions of the data are stored using unique IDs. The databases can be relational databases or non-relational databases, and each database may be stored on a single computing device or distributed across multiple computing devices.

Various aspects of the disclosure will now be described with regard to certain examples and embodiments, which are intended to illustrate but not limit the disclosure. For example, although the examples of the present application focus on the context of migration from one data source to another data source, it will be appreciated that the record aggregation techniques can be applied to any scenario in which two or more separate storage devices collectively store a set of records. Although the examples and embodiments described herein will focus, for the purpose of illustration, specific calculations and algorithms, one of skill in the art will appreciate the examples are illustrate only, and are not intended to be limiting.

Overview of Example Computing Environment with Aggregated Data

Figure 1A:
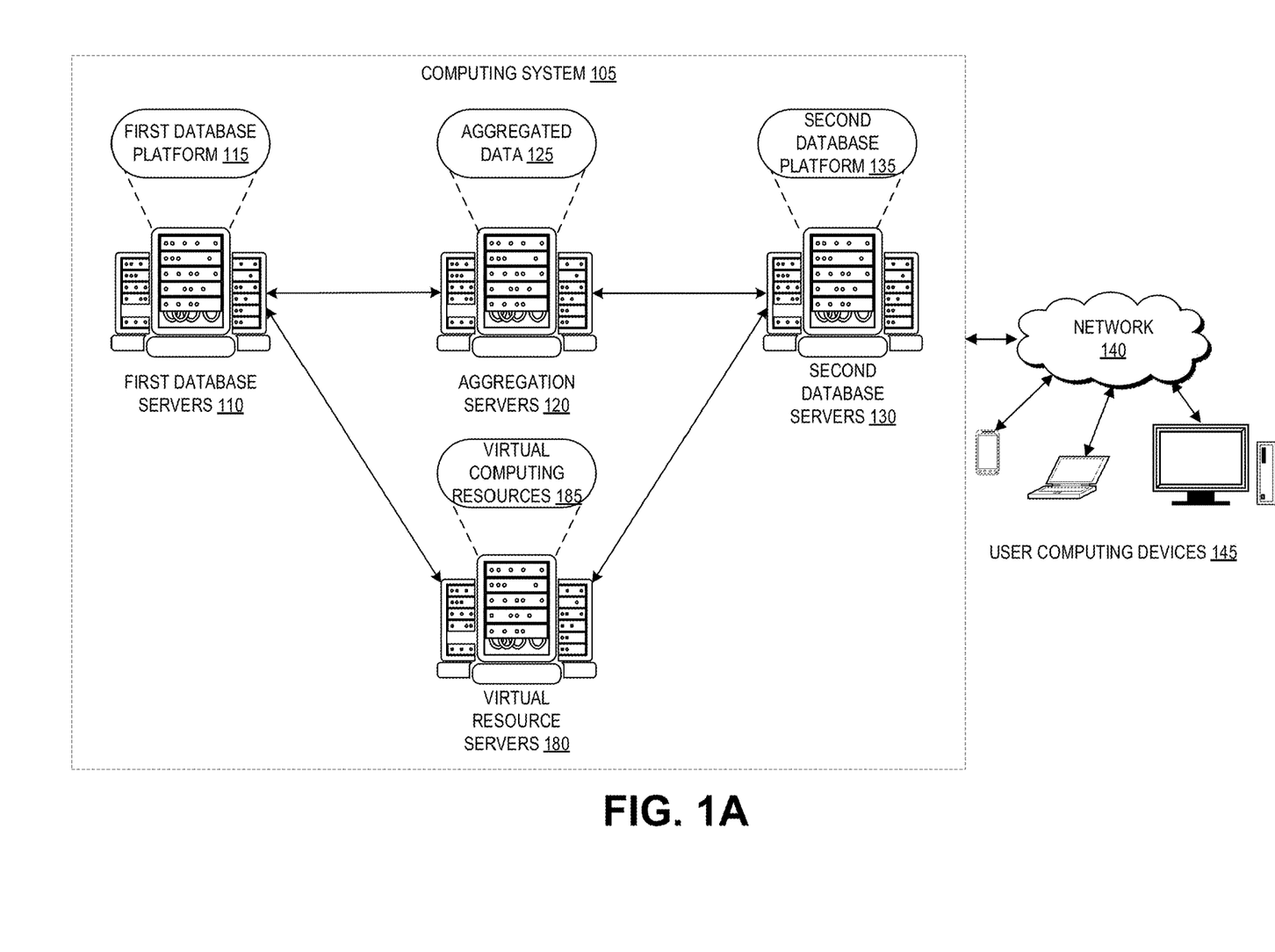
FIG. 1A depicts a schematic diagram of a computing system in which various embodiments according to the present disclosure can be implemented.

FIG. 1A depicts a computing system 105 in which the disclosed dynamic record aggregation can be implemented. The computing system 105 includes first database servers 110 that host a first database platform 115, second database servers 130 that host a second database platform 135, aggregation servers 120 that generate aggregated data 125 from the first and second database platforms, and virtual resource servers 180 that host virtual computing resources 185. Each server includes hardware computer memory and/or processors, an operating system that provides executable program instructions for the general administration and operation of that server, and a computer-readable medium storing instructions that, when executed by a processor of the server, allow the server to perform its intended functions.

The computing system 105 can be a distributed computing system (e.g., a "cloud" system) that provides users with pay-per-use access to virtual computing resources 185 hosted on the virtual resource servers 180. Cloud computing, in general, is an approach to providing access to information technology resources through services, such as Web services, where the hardware and/or software used to support those services is dynamically scalable to meet the needs of the services at any given time. The virtual computing resources 185 can include various types of data storage servers, processing servers, domain management servers, and analytics applications, to name a few examples. In cloud computing, elasticity refers to network-delivered computing resources that can be scaled up and down by the cloud service provider to adapt to changing requirements of users. The elasticity of the virtual computing resources 185 can be in terms of processing power, storage, bandwidth, etc. Elastic computing resources may be delivered automatically and on-demand, dynamically adapting to the changes in resource requirement on or within a given user's system. For example, a user can use the computing system 105 to host a large online streaming service, setup with elastic resources so that the number of web servers streaming content to users scales up to meet bandwidth requirements during peak viewing hours, and then scales back down when system usage is lighter.

A user typically will rent, lease, or otherwise pay for access to the virtual computing resources 185 through the computing system 105, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively infrastructure of on-premises computing environments, requires a system architecture that can reliably re-allocate its hardware according to the changing needs of its user base.

The illustrated first and second database servers 110, 130 can store records of usage of the virtual computing resources 185. For example, a user can take a snapshot of a virtual block storage device (a "volume") in order to create a backup copy, which can be stored using object storage on an object storage server of the computing system 105. Snapshots can be implemented as incremental records of data within a volume. Illustratively, when the first snapshot of a volume is taken, all blocks of the volume that contain valid data are copied as one or more objects to the object storage servers, and then a snapshot "table of contents" or "manifest" file is written to the object storage servers that includes a record of the one or more objects, as well as the blocks of the volume to which each of the one or more objects correspond. The illustrated first and second database servers 110, 130 can store these manifest files, among other usage record types. The usage records can be analyzed by a metering service (not illustrated) in order to determine system usage by a particular user. Usage may be aggregated after a certain period of time, for instance one month, and the user can be charged for this usage. Thus, access to an accurate and complete list of the manifest files (or other types of usage records) can be important for appropriately charging users for system usage.

In the illustrated example, the first database servers 110 host a first database platform 115, and second database servers host a second database platform 135. For example, the computing system 105 may have previously used only the first database platform 115 for storage of usage records, and may be in the process of migration to the second database platform 135 for storage of the usage records. In some scenarios, this migration process can take lengthy periods of time, for example in order to ensure data integrity of the records. During the migration process, a larger volume of records may initially be sent by the virtual resource servers 180 to the first database platform 115. Over time, the virtual resource servers 180 can begin to send a larger volume of records to the second database platform 135. Eventually, all records may be migrated to the second database platform 135.

These database platforms can store records received from other computing resources within the computing system 105, for example manifest files received from object storage servers. Each record can be associated with a primary key that serves as its unique identifier within the computing system 105. The primary keys stored on each server may not be consecutive or in numerical order. For example, an object storage server may assign a primary key to a manifest file and then route that manifest file to an available one of the first database servers 110 or second database servers 130. A manifest file created by that object storage server may be routed to a different available one of the first database servers 110 or second database servers 130. In addition, different computing resources within the computing system 105 may be assigned different ranges of primary keys that they can assign to outgoing records, and multiple computing resources can direct records to the first database servers 110 and/or second database servers 130. As such, primary keys may be assigned to records out of order when they are assigned at similar times by different computing resources, and some primary keys may not be assigned if the corresponding computing resource is not used. For one example of primary keys stored on the first and second database servers, please refer to FIG. 4, discussed below.

The first database servers 110 and second database servers 130 can be configured to replicate the first and second database platforms 115, 135. For example, the first database platform 115 may have a master replica that handles incoming records from the computing resources of the computing system 105. The first database platform 115 may also have a slave replica that receives synchronous updates from the master replica. Similarly, the second database platform 115, 135 can have a master replica and a slave replica. This data redundancy means that records will not be lost if an individual drive fails or some other single failure occurs. In some implementations of the disclosed data aggregation, the aggregation servers 120 may communicate with the slave replicas of the first and second database platforms 115, 135, in order to free up the bandwidth of the master for input/output operations, including writes of new records, writes to and reads from existing records, and deletion of records.

The computing system 105 can be provided across a number of geographically separate regions, for example to provide users with lower latencies by having their virtual computing resources 185 in or near their geographic location. Each region may be physically isolated from and independent of every other region in terms of location and power supply, and may communicate data with the other regions through the network 140. Each region can include two or more availability zones each backed by one or more physical data centers provided with redundant and separate power, networking and connectivity to reduce the likelihood of two zones failing simultaneously. In one embodiment, while a single availability zone can span multiple data centers, no two availability zones share a data center. This can protect users from data-center level failures. A data center generally refers to a physical building or enclosure that houses and provides power and cooling to one or more of the first database servers 110, second database servers 130, aggregation servers 120, and virtual resource servers 180. The data centers within an availability zone and the availability zones within a region may be connected to one another through private, low-latency links, for example fiber optic network cables. This compartmentalization and geographic distribution of computing hardware can enable the elastic computing system 120 to provide fast service to users on a global scale with a high degree of fault tolerance and stability. To distribute resources evenly across the zones in a given region, the provider of the computing system 105 may independently map availability zones to identifiers for each user account.

The computing system 105 can be accessed by user devices 145 over the network 140. The network 140 can include any appropriate network, including an intranet, the Internet, a cellular network, a local area network or any other such network or combination thereof. In the illustrated embodiment, the network 140 is the Internet. Protocols and components for communicating via the Internet or any of the other aforementioned types of communication networks are known to those skilled in the art of computer communications and thus, need not be described in more detail herein.

User computing devices 145 can include any network-equipped computing device, for example desktop computers, laptops, smartphones, tablets, e-readers, gaming consoles, and the like. Users can access the computing system 105 via their computing devices 145, over the network 140, to use, view, or manage their data and computing resources, as well as to use websites and/or applications hosted by the computing system 105.

Figure 1B:
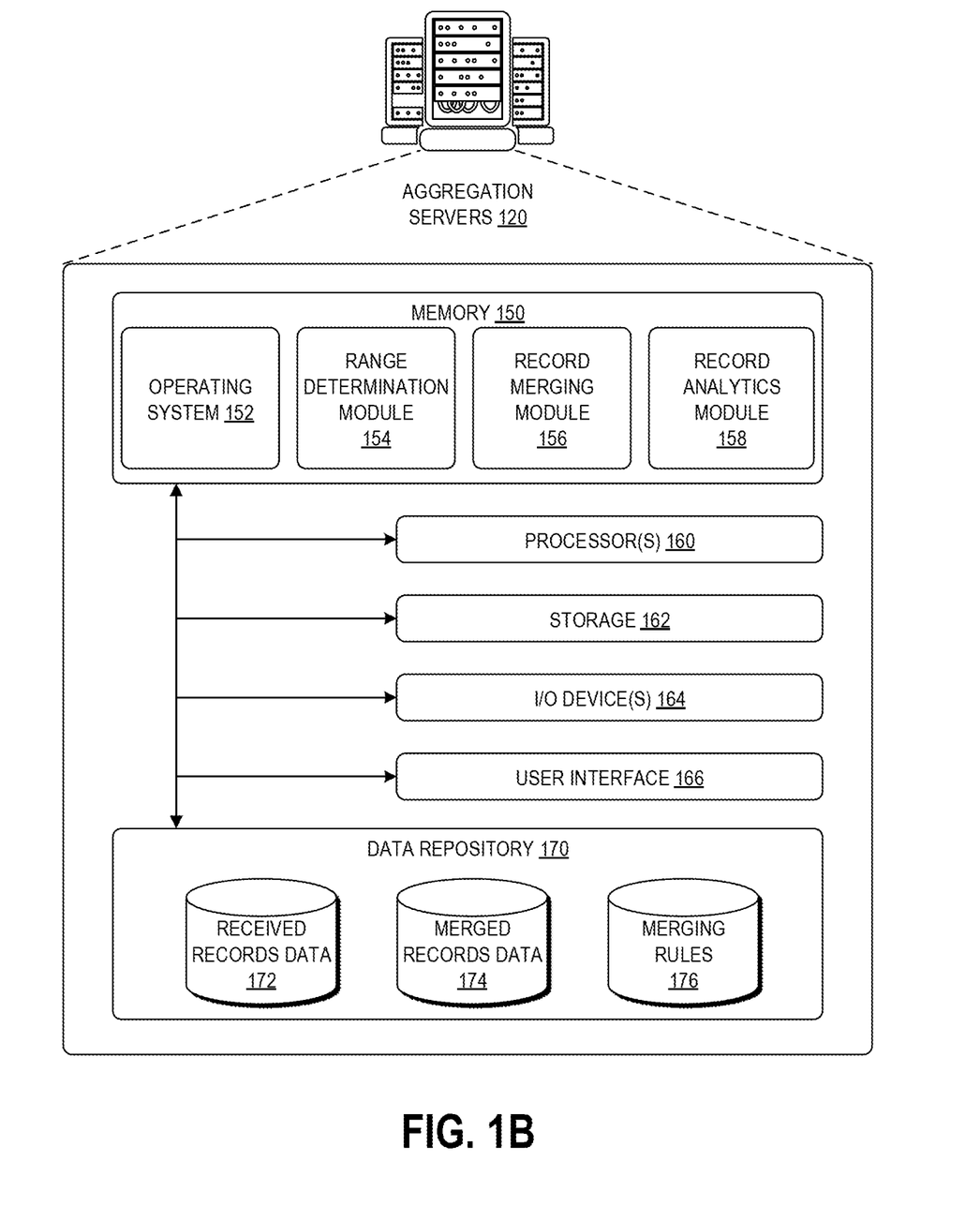
FIG. 1B depicts a block diagram of the aggregation servers of FIG. 1A, according to the present disclosure.

As will be described in more detail below, the aggregation servers 120 of the computing system 105 can be configured to provide a unified view of data spread across multiple data sources, such as the first database servers 110 and the second database servers 130. One illustrative configuration of the aggregation servers 120 is shown in FIG. 1B. As shown in FIG. 1B, the aggregation servers 120 may include one or more computers, perhaps arranged in a cluster of servers or as a server farm. The memory and processors that make up these computers may be located within one computer or distributed throughout many computers (including computers that are remote from one another) as detailed herein. These servers may be configured to dynamically aggregate data from multiple sources as described herein.

The aggregation servers 120 may include at least one memory 150 and one or more processing units (or processor(s)) 160. The memory 150 may include more than one memory and may be distributed throughout the aggregation servers 120. The memory 150 may store program instructions that are loadable and executable on the processor(s) 160 as well as data generated during the execution of these programs. Depending on the configuration and type of memory, the memory 150 may be volatile (such as random access memory ("RAM")) and/or non-volatile (such as read-only memory ("ROM"), flash memory, or other memory). In some examples, the memory 150 may include multiple different types of memory, such as static random access memory ("SRAM"), dynamic random access memory ("DRAM"), or ROM.

The memory 150 can store the program instructions as a number of modules that configure processor(s) 160 to perform the various functions described herein, for example operating system 152 for interacting with the computing system 200, as well as the page range determination module 154, record merging module 156, and record analytics module 158, which can be in direct communication with one another or distributed among computing devices within a networked computing system and in communication with each other. The configuration of the page range determination module 154, record merging module 156 are described in more detail with respect to FIGS. 2 and 3. The record analytics module 158 can manage analysis of the aggregated records, for example to determine an amount of usage of one or more of the virtual computing resources 185 by a user over a period of time, to determine an amount that should be billed to the user for that usage, and to output that amount for billing (e.g., by generating and issuing an invoice, or by outputting the amount to an invoicing service that generates and issues an invoice). Although shown as a component of the aggregation servers 120, in some embodiment, the record analytics module 158 can be implemented on a different server within the computing system 105.

The processor 160 may include one or more general purpose computers, dedicated microprocessors, graphics processors, or other processing devices capable of communicating electronic information. Examples of the processor 160 include one or more application-specific integrated circuits ("ASICs"), graphical processing units ("GPUs"), field programmable gate arrays ("FPGAs"), digital signal processors ("DSPs") and any other suitable specific or general purpose processors. The processor 160 may be implemented as appropriate in hardware, firmware, or combinations thereof with computer-executable instructions and/or software. Computer-executable instructions and software may include computer-executable or machine-executable instructions written in any suitable programming language to perform the various functions described.

In some examples, the aggregation servers 120 may also include additional storage 162, which may include removable storage and/or non-removable storage. The additional storage 162 may include, but is not limited to, magnetic storage, optical disks, and/or solid-state storage (which types of storage may be including within, for example, hard disk drives (HDDs), solid state drives (SSDs), network attached storage (NAS), or the like). The additional storage 162 and their associated computer-readable media may provide non-volatile storage of computer-readable instructions, data structures, program modules, and other data for the computing devices. The memory 150 and the additional storage 162, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, and components, may refer to programming modules executed by computing systems (e.g., processors) that are part of the architecture.

The aggregation servers 120 may also include input/output (I/O) device(s) and/or ports 164, such as for enabling connection with a keyboard, a mouse, a pen, a voice input device, a touch input device, a display, speakers, a printer, or other I/O device. The aggregation servers 120 may also include a user interface 166. The user interface 166 may be utilized by a user to access portions of the aggregation servers 120. In some examples, the user interface 166 may include a graphical user interface, web-based applications, programmatic interfaces such as application programming interfaces (APIs), or other user interface configurations. The user interface 166 can include displays of the aggregated data records, data sources, and merging rules described herein. In some embodiments, the I/O device(s) and/or ports 164 and user interface 166 can be part of a user computing device accessing the aggregation servers 120 via network 140.

The aggregation servers 120 also include a data store 170. In some examples, the data store 170 may include one or more data stores, databases, data structures, or the like for storing and/or retaining information associated with the aggregation servers 120. Thus, the data store 170 may include data structures, such as received records repository 172, merged records data repository 174, and merging rules data repository 176. The received records repository 172 comprises one or more physical data storage devices that stores data representing the records received from different data sources (e.g., first database platform 115, second database platform 135) in response to paging requests. The merged records data repository 174 comprises one or more physical data storage devices that stores data representing the records after merging by the record merging module 156. The merging rules data repository 176 comprises one or more physical data storage devices that stores data representing the rules for how data is merged in the event of a conflict. A conflict can occur, for example, when two records having conflicting information are sent to the aggregation servers 120 from different data sources. Conflicting information may include, for example, sharing a common identifier (e.g., a primary key value) but differing in other information (e.g., other values for the record). When a conflict occurs, the merging rules 176 can specify which data source has authority (e.g., which data source provides records that will be used in the merged list, with the conflicting records discarded).

Overview of Example Aggregation Workflows

Figure 2:
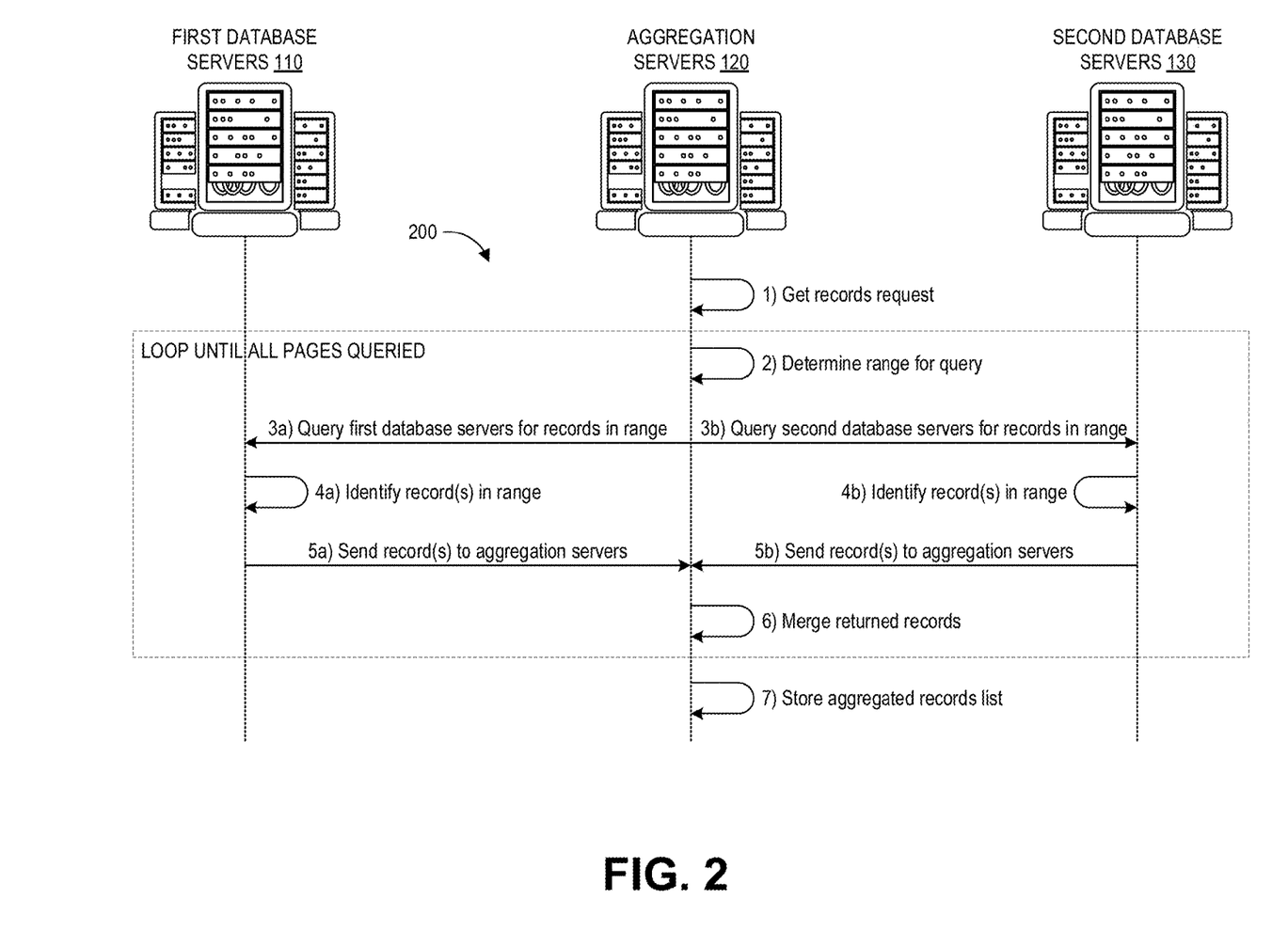
FIG. 2 depicts a schematic diagram of a process for dynamically aggregating data from different sources within the computing system of FIG. 1A.

FIG. 2 depicts a schematic diagram of a process for dynamically aggregating data from different sources within the computing system 105. FIG. 2 depicts data communications between the first database servers 110, aggregation servers 120, and second database servers 130 for dynamic aggregation of data records using the process. Beneficially, the process can be implemented on the fly, that is, in response to the records analytics module 158 requesting records for analysis, without introducing significant increases in time required to respond to such requests.

With continued reference to FIG. 2, illustrative interactions 200 are depicted for initiating aggregation of records from the first and second database servers 110, 130. The interactions of FIG. 2 begin at (1), where the aggregation servers 120 process a get records request. For example, the record analytics module 158 may trigger such request, either on demand or on a period schedule. Though not illustrated, some implementations of the interaction 200 can include an initial query to the first and second database servers 110, 130 to determine minimum and maximum record IDs in the collective records of their databases. These minimum and maximum record IDs can be used in range determinations, as described in more detail below. Other implementations may omit this query.

In response to the request, at (2) the aggregation servers 120 determine the range of records to request with a first query to the first and second database servers 110. An example process for determining this range is described further with respect to FIG. 3. For example, the aggregation servers 120 can query the databases to ascertain a lowest primary key stored in any of the databases that comes after the previously queried range (or an initial lowest primary key, for a first query). As described in further detail below, this can prevent the aggregation servers 120 from issuing a query that returns no record results.

After determining the range of records for the present query, at (3a) and (3b) the aggregation servers 120 query the first and second database servers 110, 130 for records in the determined range. Specifically, the query of interaction (3a) to the first database servers 110 can be sent simultaneously or concurrently as the query of interaction (3b) to the second database servers 130. This sending of multiple copies of the same record request to multiple databases is referred to herein as a "lockstep paging system." If a particular implementation involves more than two data sources, page requests can be sent to all data sources at the same time. Although described as being sent "simultaneously" or "at the same time," it will be appreciated that, due to communications channel and processing operations, the record queries may not be sent at precisely the same moment in time, but may in fact be sent rapidly one after the other. A simultaneous query of multiple databases refers to sending the query to multiple databases in response to the same query range determination. The query of the different databases can additionally include certain criteria regarding which records to return, for example criteria specifying to only return records that originate or were modified within a certain timeframe. These criteria may originate from the analytics application that will process the eventual merged record list. For example, in the context of records reflecting usage of a system, the analytics application may only be interested in usage that happened within a designated timeframe (e.g., the previous month). As such, using this criteria to filter the records that make it into the merged record list can save the analytics application processing time that would otherwise be spent filtering out unneeded records.

In some implementations, the criteria may depend upon the type of data being queried. For example, some record requests may relate to immutable values (e.g., values of the record that do not change over time), while other record requests may relate to mutable values of the records. As example of immutable values, a record request may specify to aggregate all snapshots that share an account or all snapshots related to a particular block storage volume.

Next, at interaction (4a) the first database servers 110 query their databases for records in the range that meet the specified criteria. Similarly, at interaction (4b) the second database servers 130 query their databases for records in the range. Because the records on the two database server sets can vary, interactions (4a) and (4b) may take different amounts of processing time. Thus, although the record identification requests may be sent simultaneously or concurrently, they can be run asynchronously on the different database servers.

At interaction (5a), the first database servers 110 send any identified records in the range to the aggregation servers 120. Similarly, at interaction (5b) the second database servers 130 send any identified records in the range to the aggregation servers 120. Again, due for example to the potential run time differences for the record identification processes run on the database servers, the records sent at interactions (5a) and (5b) may arrive at different times.

After receiving records (or a response indicating that no records match the range of the recent page), at interaction (6) the aggregation servers 120 merge the returned records. For example, the aggregation servers 120 can execute a merge-sort algorithm that first sorts the record set received from each database in numerical order (or alphabetical order for primary keys having alphanumeric characters), and then merges the record sets according to the merging rules 176. As described above, the merging rules 176 can specify which database has authority in the event of a conflict. For example, in the context of database migration, the migrated database (e.g., the newer database) may be granted authority over the source database (e.g., the older database) in some implementations. In other implementations the source database may be granted authority. The aggregation servers 120 can implement the merging rules 176 to maintain the record from the authoritative database in the event of a conflict.

At interaction (7) the aggregation servers 120 can store or transmit the aggregated records list. In some implementations the merged results from each query can be separately sent to the requesting application (e.g., an analytics application, administrative portal). In such implementations, no aggregate merged list may be stored on the aggregation servers 120, and the requesting application can construct the overall merged dataset from the individual merged results sets provided by the aggregation servers 120. For example, each query may be item-potent, so that nothing is stored on the aggregation servers 120 in between each query. Rather, every time a request for records is made from a client host external to the aggregation host, the results of each individual query can be returned to the client host, and the client host can add them to their own list. In other implementations the aggregation servers 120 can accumulate and store the overall merged dataset.

Figure 3:
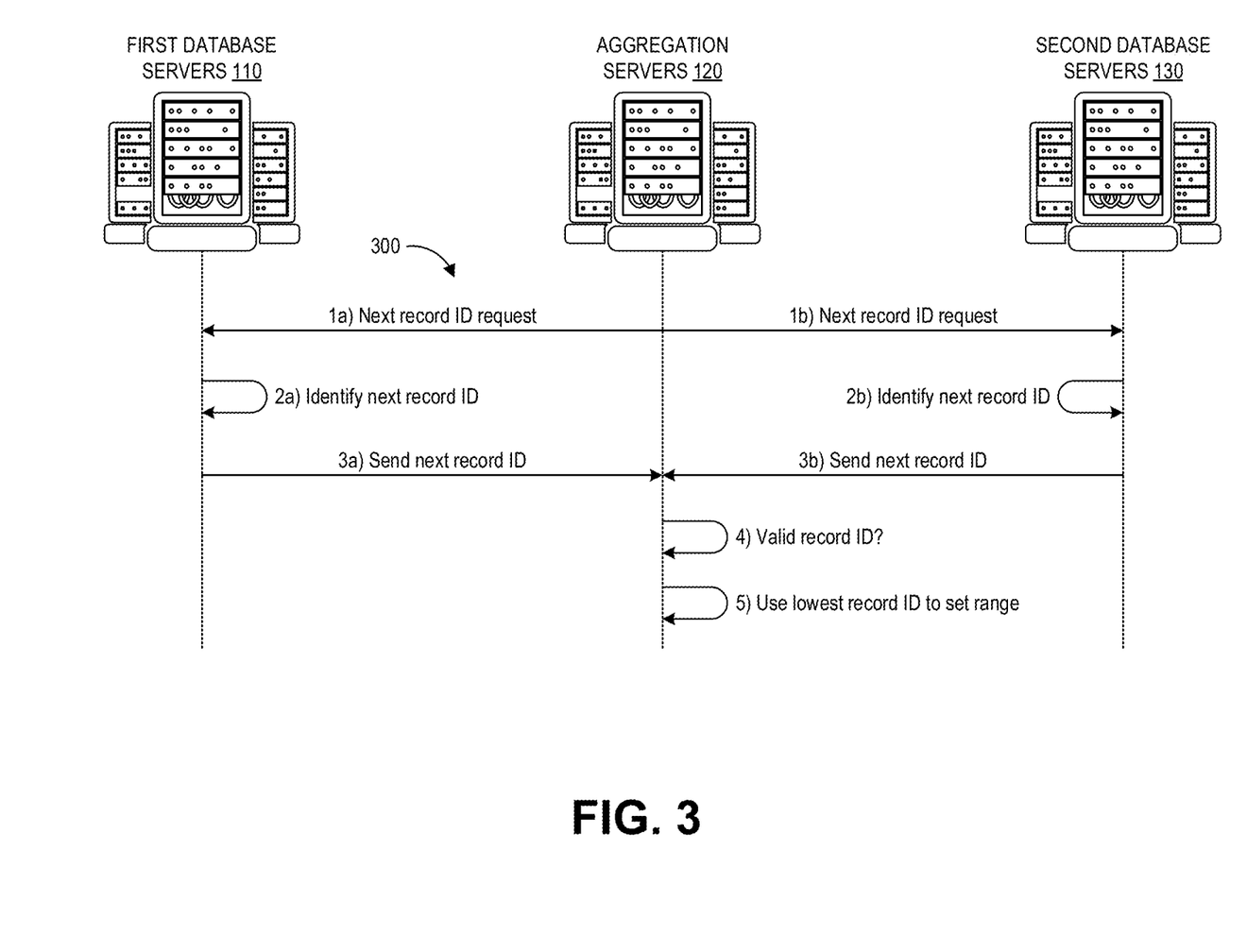
FIG. 3 depicts a schematic diagram of a process for determining page range during the workflow of FIG. 2.

FIG. 3 depicts a schematic diagram of illustrative interactions 300 for a process for determining page range during the workflow of FIG. 2, for example at interaction (2). As described above, the databases can store records associated with non-consecutive primary keys. In some scenarios, this can result in large gaps between successive primary keys stored across the databases. To illustrate, consider an example lockstep paging scheme in which the range interval amount is set to 50 primary keys, and in which the databases have collectively stored thereon records with primary keys ranging from 5-95 and from 805-1000. Without any dynamic range determination, a first query for records in the range of 1-50 would return results, and a second query for records in the range of 51-100 would return results. However, a number of subsequent queries (e.g., for records in the range of 101-150, 151-200 . . . up to 751-800) would return no results. These fruitless queries (and the associated wasted time) can be avoided by the dynamic range determination depicted in FIG. 3, which can identify that there are no records in these ranges and prevent such queries from being issued. The aggregation servers 120 determine the range for a given page by advancing the start of the range to the lowest primary key record in either (or any, in the case of three or more) database that comes after the previous range. Beneficially, this reduces the amount of time spent during the aggregation process to query and merge all records.

Specifically, at interaction (1a) the aggregation servers 120 send a next record ID request to the first database servers 110. At the same time, at interaction (1b) the aggregation servers 120 send a next record ID request to the second database servers 130. These interactions may be omitted for the first range determination in implementations that make an initial query of the minimum and maximum record IDs, as described above, and the minimum record ID can be used to set the range for the first query.

Accordingly, at interaction (2a) the first database servers 110 query the stored records to locate the next record ID. Next, at interaction (3a) the first database servers 110 send the identified next record ID back to the aggregation servers 120. As interactions (2a) and (3a) are being handled by the first database servers 110, the second database servers 130 execute interactions (2b) and (3b). Specifically, the second database servers 130 query the stored records to locate the next record ID at interaction (2b), and at interaction (3b) the second database servers 130 send the identified next record ID back to the aggregation servers 120. It will be appreciated that the responses of interactions (3a) and (3b) may be received at different times by the aggregation servers 120. If there are no records that have IDs after the previously queried range, the first or second database servers can send an indication that there is no valid record ID.

After receiving the responses from the first and second database servers, the aggregation servers 120 can perform a check at interaction (4) to identify whether it has received any valid record IDs. If not, this can indicate that the process of paging the databases for their records has completed, as there are no remaining records, and the paging process can terminate and store the final merged record list. In implementations that initially query for the maximum record ID, interaction (4) can instead involve determining whether the previously queried range overlaps with the maximum record ID (in which case, all records have been queried and the process ends).

If a valid record ID is received from one or both of the first and second database servers, the aggregation servers 120 can use this ID at interaction (5) to set the range of records for the next query. If both database servers provide record IDs, the aggregation servers 120 can select the lowest record ID and set the low end of the range to the lowest received record ID. In some implementations, the high end of the range can be set some predetermined number of record IDs beyond the lowest received record ID, for example 50, 100, or more or less in various implementations. To illustrate, consider the following example: the first database servers 110 return a next record ID of 232, the second database servers 130 return a next record ID of 301, and the page range is set to 50 pages. The aggregation servers 120 would select record ID 232, and set the range for the next page to 232-282. In other implementations, no high end of the range may be set, and a certain number of records can be returned according to the capacity of the query protocol. For queries relating to immutable values, some implementations may set ranges using only a lower limit ID without an upper bound on each database query, and instead take in as many as possible based on the query operator (e.g., the SQL limit operator). For queries relating to mutable values, some implementations can predetermine the range interval to be sure that they scan the entire database, and thus use ranges with both a lower and upper limit ID.

Overview of Example Records

Figure 4:
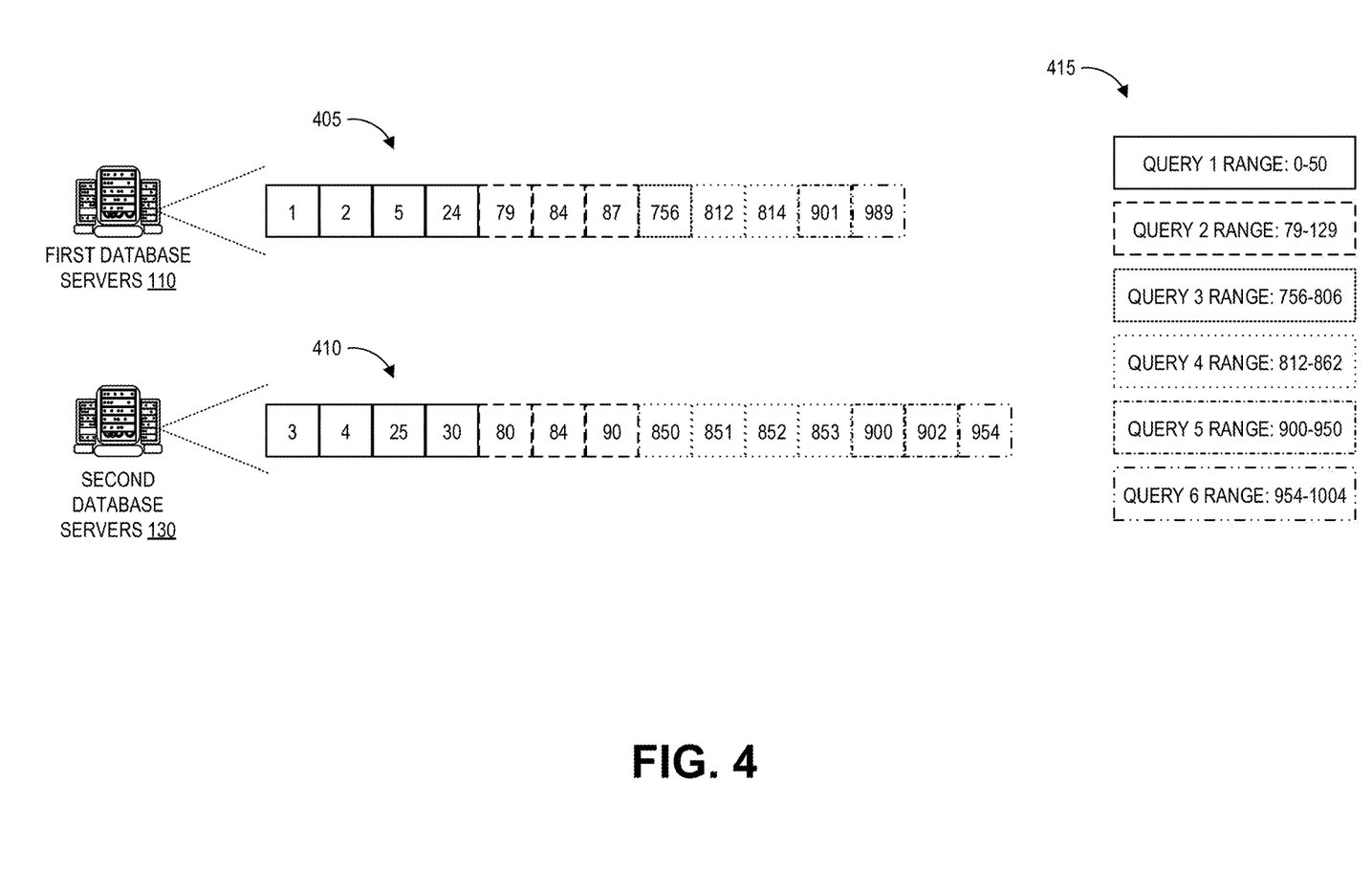
FIG. 4 depicts a schematic diagram of page ranges and record primary keys in two different data sources within the computing system of FIG. 1A.

FIG. 4 depicts a schematic diagram of query ranges and record primary keys in two different data sources within the computing system of FIG. 1A. Specifically, FIG. 4 depicts a first set of records 405 stored on the first database servers 110, a second set of records 410 stored on the second database servers 130, and a legend 415 indicating which of those records are queried during each of six different queries. The legend 415 also illustrates the ranges determined for each of the pages. The records are shown by their primary keys (e.g., their record IDs).

The first database servers 110 are referred to as Slave 1 in the discussion below, and the second database servers 130 are referred to as Slave 2. As described above, the records can be stored in a replicated master-slave architecture. By configuring the aggregation servers 120 to communicate with the slave replicas to obtain the records, this can beneficially free up the bandwidth of the master replicas for input/output operations, as described above. For example, if the master replicas are used for the disclosed record aggregation, they may have to queue or otherwise delay incoming requests for reads and/or writes to their stored records. Although the example of FIG. 4 is in the context of querying the database slaves, it will be appreciated that these techniques can equally apply to querying the master replica, as well as to querying single instance databases in non-redundant data storage architectures.

The illustrated query ranges from each slave database will be queried as described with respect to FIG. 2, and the records that meet all criteria will be returned to the aggregation servers 120. For example, for Query 1, assume record 2 and record 24 from Slave 1 and record 4 and record 30 from Slave 2 meet the criteria. In this example, these four records are the only records returned from each slave in response to Page 1, so there are no conflicts. This result set would be record 2, record 4, record 24, record 30 after merging. This is achieved by simply merging the results into a unified set using the "merge" strategy of the merge-sort algorithm.

For Query 2, a conflict needs to be resolved because the record 84 is present on both slaves. There are a few ways that this could happen. In a first scenario, consider that both versions of record 84 meet the criteria and are returned from each slave's query. In this case, the merging strategy skips the version of record 84 from Slave 1 and only returns the version from Slave 2. For example, the merging rules can specify that the second database servers 130 have authority in the event of conflicts.

In a second scenario, consider that only Slave 2's version of record 84 meets the criteria and is returned from its query. In this case, the version of record 84 from slave 1 is never even returned from the query, so there is no conflict to address during merging.

In a third scenario, consider that only Slave 1's version of record 84 meets the criteria and is returned from its query. For example, the criteria may specify a timeframe of origination or modification of a record. This timeframe may not overlap with a recent timeframe occurring just prior to implementing the lockstep paging process. A certain record may begin and/or complete the process of migration from Slave 1 to Slave 2 during this recent timeframe, and thus the original record 84 of Slave 1 would satisfy the timeframe criteria while the migrated record 84 of Slave 2 would not. In this example, Slave 1 can have a mix of migrated and non-migrated records, and Slave 2 can have a mix of new records and records migrated from Slave 1. No new records may be written to Slave 1, which can be in the process of migrating its records to Slave 2. Each record may have a "migrated" flag associated with it (set, for example, to 1 if the record has been migrated and 0 if the record has not been migrated) and may also include a timestamp indicating the time of migration (if the record has been migrated).

In this third scenario, consider that Slave 2's version of record 84 is in the process of migration or has been very recently migrated. Thus, Slave 2's version of record 84 will not be returned from the query because it originates outside the query timeframe criteria, so it will not override Slave 1's version like in the first scenario. Allowing Slave 1's version of record 84 into the unified set when the authority record in Slave 2 does not meet the criteria is an error. Therefore, the query criteria of the present disclosure can be modified to only allow migrated records from Slave 2 if they have been migrated during the recent timeframe (e.g., within the last day, hours, or minutes, and/or any point in time up until the present time during the lockstep paging process). The servers can identify whether the records satisfy the criteria using the timestamp information of migrated records. This can block all migrated records from Slave 1 from entering the unified dataset by modifying the criteria and allowing the corresponding migrated record from Slave 2. It will be appreciated that this criteria adjustment would still not allow for those records of Slave 2 that are currently migrating, as these records are marked as migrated in Slave 1 but are not necessarily present yet in Slave 2. For an analytics-related query, this recency window is acceptable, as the changes made to a record in Slave 2 within this window can be ignored.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes may begin in response to an event, such as on a predetermined or dynamically determined schedule, on demand when initiated by a user or system administer, or in response to some other event. When the process is initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, the process or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A computing system, comprising:
a first set of servers having stored thereon an first database platform hosting a first set of records, wherein the first set of servers comprises one or more hardware processors;
a second set of servers having stored thereon a second database platform hosting a second set of records, wherein the second set of servers comprises one or more hardware processors;
a third set of servers, wherein the third set of servers comprises one or more hardware processors, the one or more hardware processors of the third set of servers configured with computer-executable instructions to aggregate the first set of records and the second set of records by at least:
   determining a range of records for a first query at least partly by
      querying the first set of servers for a lowest record identifier occurring in the first set of records,
      querying the second set of servers for a lowest record identifier occurring in the second set of records,
      identifying a lowest record identifier of the first and second sets of records by comparing the lowest record identifier occurring in the first set of records to the lowest record identifier occurring in the second set of records,
      setting a lower bound of the range to the lowest record identifier of the first and second sets of records, and
      setting an upper bound of the range based at least in part on a predetermined interval of records from the lowest record identifier of the first and second sets of records;
   sending, to each of the first set of servers and the second set of servers, the first query for records falling within the range of records;
   receiving, from the first set of servers, a first subset of records of the first set of records falling within the range of records;
   receiving, from the second set of servers, a second subset of records of the second set of records falling within the range of records;
   merging the first subset of records and the second subset of records into a merged dataset, wherein records returned from the second set of servers have authority over records returned from the first set of servers for any conflicting records; and
   sending a second query to the first and second sets of servers; and
   merging an additional subset of records returned in response to the second query, wherein records returned from the second set of servers have authority over records returned from the first set of servers for any conflicting records.

2. The computing system of claim 1, wherein the third set of servers is configured with computer-executable instructions to determine a second range of records for the second query by at least:
querying the first and second sets of servers for a next lowest record identifier occurring after the range;
setting a lower bound of the second range to the next lowest record identifier; and
setting an upper bound of the second range based at least in part on a predetermined interval of records from the next lowest record identifier.

3. The computing system of claim 1, wherein the third set of servers is configured with computer-executable instructions to:
identify a first record received from the first set of servers and a second record received from the second set of servers that share a common record identifier;
determine that the second set of servers have authority; and
maintain the second record in the merged list.

4. The computing system of claim 1, further comprising an analytics module configured to run an analytics application on the merged dataset.

5. The computing system of claim 1, wherein the first database platform is in process of migration to the second database platform, wherein the first query includes criteria that are usable by the first database platform and the second database platform to filter records that were modified or originated outside of a designated timeframe, and wherein the wherein the third set of servers is configured with computer-executable instructions to modify the criteria to allow the second database platform to send records that were migrated to the second database platform from the first database platform after the designated timeframe.

6. A computer-implemented method for aggregating data from at least two separate data sources, the computer-implemented method comprising:
determining a first range of records for a first query, wherein determining the first range of records for a first query comprises:
   identifying a lowest record identifier occurring in a first data source of the at least two separate data sources,
   identifying a lowest record identifier occurring in a second data source of the at least two separate data sources,
   identifying a lowest record identifier of the first and second data sources by comparing the lowest record identifier occurring in the first data source to the lowest record identifier occurring in the second data source,
   setting a lower bound of the first range to the lowest record identifier of the first and second data sources, and
   setting an upper bound of the first range based at least in part on a predetermined interval of records from the lowest record identifier of the first and second data sources;
sending, to each of the at least two separate data sources, the first query for any records falling within the first range of records;
receiving, from the first data source of the at least two separate data sources, a first set of records falling within the first range;
receiving, from the second data source of the at least two separate data sources, a second set of records falling within the first range;
merging the first set of records and the second set of records into a merged dataset, wherein records returned from the second data source have authority over records returned from the first data source for any conflicting records;
sending a second query to the at least two separate data sources for a second range of records; and
merging an additional set of records returned from the second query, wherein records returned from the second data source have authority over records returned from the first data source for any conflicting records.

7. The computer-implemented method of claim 6, further comprising iteratively performing, for each additional query of a set of additional queries, until a complete set of records has been queried from the at least two separate data sources:
   determining a next range of records that comes after a previously queried range of records;
   sending the additional query to the at least two separate data sources for the next range of records; and
   merging additional records returned from the additional query, wherein records returned from the second data source have authority over records returned from the first data source for any conflicting records.

8. The computer-implemented method of claim 7, wherein determining that the complete set records has been queried further comprises:
   sending a query to the at least two data sources requesting a next record identifier that comes after a most recently queried range of records; and
   receiving no record identifier in response to the query.

9. The computer-implemented method of claim 7, wherein determining the next range of records further comprises:
   sending a query to the at least two data sources requesting a next record identifier that comes after the previously queried range of records;
   identifying a lowest record identifier received in response to the query; and
   setting a lower bound of the next range of records to the lowest record identifier received in response to the query.

10. The computer-implemented method of claim 6, further comprising performing analytics using the merged dataset.

11. The computer-implemented method of claim 6, further comprising executing queries for records falling within the first range in parallel on at least two data sources.

12. The computer-implemented method of claim 6, wherein the first data source is in process of migration to the second data source, the computer-implemented method further comprising:
   determining criteria for the first and second queries, wherein the criteria are usable by the first and second data sources to filter, from the first and second sets of records, records that were modified or originated outside of a designated timeframe; and
   modifying the criteria to allow the second data source to send records that were migrated to the second data source from the first data source after the designated timeframe.

13. A non-transitory computer-readable medium storing instructions that, when executed, cause at least one computing system to perform operations comprising:
   receiving a request from an application for a dataset including records that are being stored across a plurality of separate data sources comprising at least a first data source and a second data source;
   sending a series of queries to the first data source and the second data source, wherein each query in the series of queries requests records falling within a range of the records that is different from other queries in the series of queries;
   receiving, from the first data source, a first subset of the records in response to each query in the series of queries;
   receiving, from the second data source, a second subset of the records in response to each query in the series of queries;
   merging the first subset of the records and the second subset of the records at least partly by identifying, for any conflicting records, an authoritative data source of the plurality of data sources;
   determining that a complete set of the records has been queried at least partly by:
      sending, to the first data source and the second data source, a query requesting a next record identifier that comes after a most recently queried range of records, and
      receiving no record identifier in response to the query; and
   in response to determining that the complete set of the records have been queried, providing the merged subsets to the application for compilation into the dataset.

14. The non-transitory computer-readable medium of claim 13, the operations further comprising iteratively performing, for each query of the series of queries:
   determining a range of records for the query, wherein, for a second query of the series through a last query of the series, the range comes after a previously queried range of records; and
   sending the query for the range of records to the first data source and the second data source.

15. The non-transitory computer-readable medium of claim 13, the operations further comprising iteratively performing the series of queries until the complete set of records has been queried.

16. The non-transitory computer-readable medium of claim 13, the operations further comprising:
   identifying that a first record received from the first data source of the plurality of data sources and a second record received from the second data source of the plurality of data sources share a common record identifier;
   determining that the second data source has authority;
   omitting the first record from the dataset; and
   maintaining the second record in the dataset.

17. The non-transitory computer-readable medium of claim 13, wherein at least one data source of the plurality of separate data sources is in process of migration to the authoritative data source, the operations further comprising:
   determining criteria for the series of queries, wherein the criteria are usable by the plurality of separate data sources to filter records that were modified or originated outside of a designated timeframe from the first and second subsets of the records sent in response to the series of queries; and
   modifying the criteria to allow the authoritative data source to send records that were migrated to the authoritative data source after the designated timeframe.

* * * * *